(12) United States Patent
Haartsen

(10) Patent No.: US 6,804,542 B1
(45) Date of Patent: Oct. 12, 2004

(54) SLEEP MODES IN PEER-TO-PEER COMMUNICATIONS

(75) Inventor: Jacobus Cornelis Haartsen, Hardenberg (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 387 days.

(21) Appl. No.: 09/667,505

(22) Filed: Sep. 22, 2000

(51) Int. Cl.[7] ............................. H04M 1/00; H04B 7/00
(52) U.S. Cl. .................... 455/574; 455/517; 455/343.2; 455/127.5; 713/323; 370/311; 340/7.38
(58) Field of Search ................................. 455/464, 574, 455/462, 572, 343.1, 343.2, 343.4, 343.3, 517, 41.2, 127.1, 127.5; 340/7.33, 7.38; 375/356, 134, 358, 359; 370/311, 312, 313, 314; 713/300, 310, 320, 323

(56) References Cited

U.S. PATENT DOCUMENTS

| | | | | |
|---|---|---|---|---|
| 5,301,225 A | | 4/1994 | Suzuki et al. ............... | 455/574 |
| 5,511,090 A | | 4/1996 | Denton et al. .............. | 370/342 |
| 5,627,882 A | * | 5/1997 | Chien et al. ................ | 455/464 |
| 5,758,278 A | | 5/1998 | Landsdowne ............... | 455/574 |
| 5,794,146 A | | 8/1998 | Sevcik et al. ............... | 455/515 |
| 5,883,885 A | | 3/1999 | Raith .......................... | 370/311 |
| 5,940,431 A | | 8/1999 | Haartsen et al. ............ | 370/311 |
| 6,292,508 B1 | * | 9/2001 | Hong et al. ................. | 375/134 |
| 6,501,969 B1 | * | 12/2002 | Cannon et al. ............. | 455/574 |

FOREIGN PATENT DOCUMENTS

| | | | | |
|---|---|---|---|---|
| EP | 0490441 A2 | * 12/1991 | ............ | H04Q/7/04 |
| EP | 0 490 441 | 6/1992 | ............ | H04Q/7/04 |
| EP | 0 944 273 | 9/1999 | ............ | H04Q/7/32 |
| WO | 00/04738 | 7/1999 | ............ | H04Q/7/32 |

OTHER PUBLICATIONS

Jaap Haartsen, Bluetooth—The Universal Radio Interface for Ad Hoc, Wireless Connectivity; Ericsson Review, No. 3, 1998, pp. 110–117.

Garg, Sumit et al., "MAC Scheduling Policies for Power Optimization in Bluetooth: A Master Driven TDD Wireless System", VTC 2000–Spring. 2000 IEEE 51st. Vehicular Technology Conference Proceedings. Tokyo, Japan, May 15–18, 2000, New York, NY, vol. 1 of 3 Conf. 51, pp. 196–200.

* cited by examiner

*Primary Examiner*—Charles Appiah
*Assistant Examiner*—Rafael Perez-Gutierrez
(74) *Attorney, Agent, or Firm*—Burns, Doane, Swecker & Mathis, L.L.P.

(57) ABSTRACT

A system and method for conserving power in a radio communication network wherein a radio receiver periodically scans for a transmitted signal. If a signal is not received after a predetermined period of time, the period between scans is increased. In a multi-unit system, the scan periods are offset from an absolute time reference to prevent more than one unit from transmitting at the same time.

19 Claims, 8 Drawing Sheets

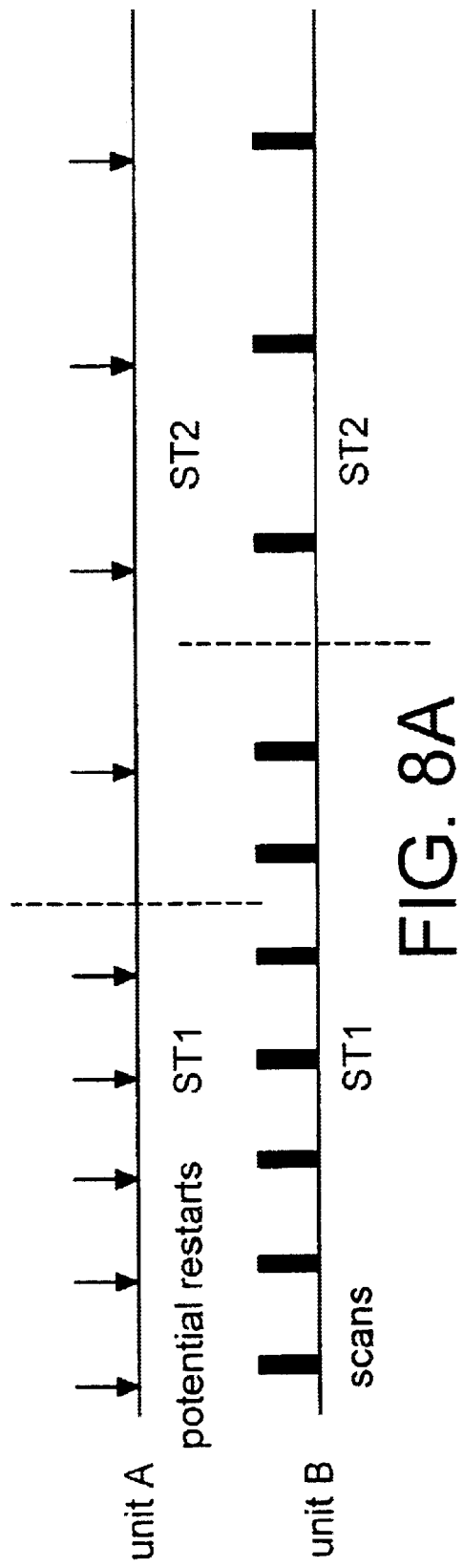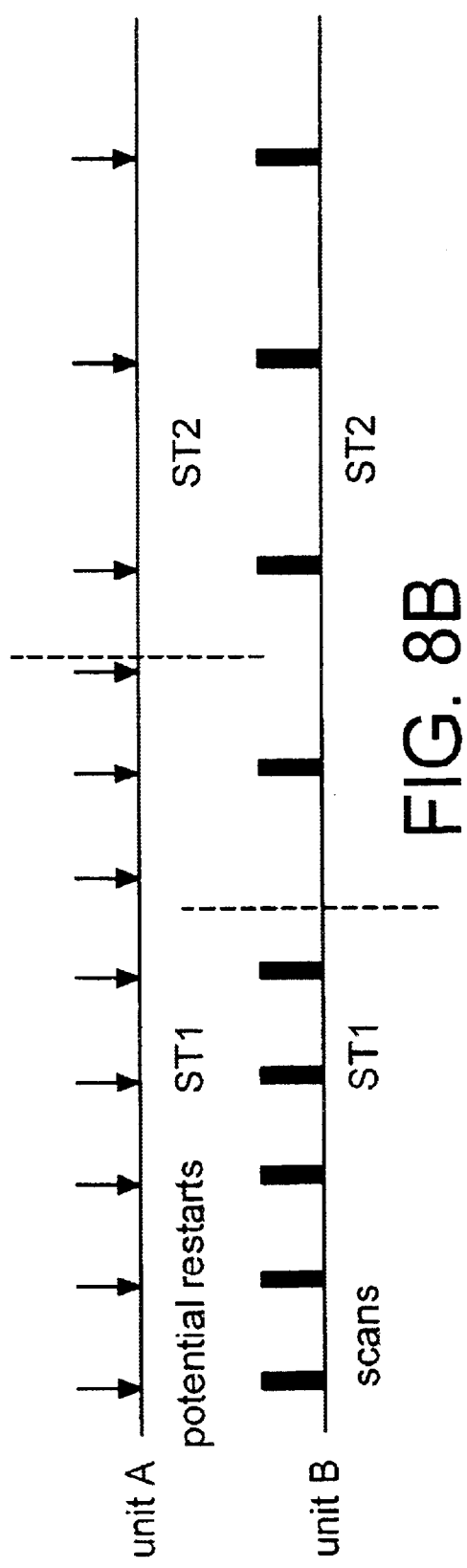

SLEEP MODES IN PEER-TO-PEER COMMUNICATIONS

BACKGROUND

The present invention relates to electronic communication systems and, more particularly, to sleep modes in asynchronous data communication schemes.

In the last decades, progress in radio and VLSI technology has fostered widespread use of radio communications in consumer applications. Mobile radios and other portable devices are common consumer devices.

Presently, the primary focus of wireless communication technology is on voice communication. This focus will likely expand in the near future to provide inexpensive radio equipment which can be easily integrated into mobile and stationary devices. For instance, radio communication can be used to create wireless data links and thereby reduce the number of cables used to connect electronic devices. Recently, a new radio interface called Bluetooth was introduced to replace the cables used to connect laptop computers, headsets, PDAs, and other electronic devices. Some of the implementation details of Bluetooth are disclosed in this application, while a detailed description of the Bluetooth system can be found in "BLUETOOTH—The universal radio interface for ad hoc, wireless connectivity," by J. C. Haartsen, Ericsson Review No. 3, 1998.

Radio communication systems for personal use differ significantly from radio systems like the public mobile phone network. Public mobile phone networks use a licensed band which is fully controlled by the network provider and guarantee a substantially interference-free channel.

In contrast, personal radio communication equipment operates in an unlicensed spectral band and must contend with uncontrolled interference. One such band is the globally-available ISM (Industrial, Scientific, and Medical) band at 2.45 GHz. The band provides 83.5 MHz of radio spectrum. Since the ISM band is open to anyone, radio systems operating in this band must cope with several unpredictable sources of interference, such as baby monitors, garage door openers, cordless phones, and microwave ovens. Interference can be avoided using an adaptive scheme that finds an unused part of the spectrum. Alternatively, interference can be suppressed by means of spectrum spreading. In the U.S., radios operating in the 2.45 GHz ISM band are required to apply spectrum-spreading techniques if their transmitted power levels exceed about 0 dBm.

Bluetooth radios use a frequency-hop/time-division-duplex (FH/TDD), spread spectrum access scheme. This radio technology supports low-cost, low-power implementations. Frequency-hop systems divide the frequency band into several hop channels. During a connection, radio transceivers hop from one channel to another in a pseudo-random fashion. The instantaneous (hop) bandwidth is small in frequency-hop radios, but spreading is usually obtained over the entire frequency band. This results in low-cost, narrow-band transceivers with strong immunity to interference. Occasionally, interference jams a hop channel, causing faulty reception. When this occurs, error-correction schemes in the link can recover lost data.

The channel is divided into time slots, or intervals of 625 $\mu s$, wherein a different hop frequency is used for each slot. This results in a nominal hop rate of 1,600 hops per second. One packet can be transmitted per interval/slot. Subsequent slots are alternately used for transmitting and receiving, which results in a TDD scheme.

The channel makes use of several, equally spaced, 1 MHz hops. With Gaussian-shaped frequency shift keying (FSK) modulation, a symbol rate of 1 Mbit/s can be achieved. In countries where the open band is 80 MHz or broader, 79 hop carriers have been defined. On average, the frequency-hop sequence visits each carrier with equal probability.

Bluetooth radio communications are based on peer communications and ad-hoc networking. In peer communications, all units are equal and a hierarchical network with a fixed infrastructure of base stations and portable terminals is not required. There is no centralized control that provides resource and connection management and other support services. In ad-hoc networks, which are usually based on peer communications, any unit can establish a connection to any other unit within range.

One application for Bluetooth-enabled communication units is the replacement of cables that connect computing or communication devices, such as computers, printers, mobile terminals, and the like. For systems such as Bluetooth to replace cables, data traffic over the radio interface must be very flexible. The enabling protocol must support both symmetric and asymmetric traffic flows and synchronous and asynchronous clocking schemes. In Bluetooth, a flexible communication channel is achieved using a slot structure without an overriding multi-slot frame structure. Bluetooth divides the time domain into slots and Bluetooth-enabled units are free to allocate the slots as necessary for transmission or reception.

As in other mobile radio communication systems, one important issue in peer-to-peer and ad-hoc communications is power conservation in mobile terminals. Since the radio communication typically takes place between portable and mobile equipment, low power consumption is essential to preserve battery life.

In communication networks, like cellular networks, low power modes are supported by the control channels of the network base stations. Such power conservation schemes are described in U.S. Pat. No. 5,794,146 to Sevcik et al., U.S. Pat. No. 5,758,278 to Lansdowne, commonly-assigned U.S. Pat. No. 5,883,885 to Raith, and International Patent Publication No. WO 00/04738. The base stations are typically fixed and not subject to power limitations. Once the terminal is synchronized to the base station, the terminal can enter a very low power mode. While in a low power mode, the terminal periodically scans for a signal from the base station, with each scan lasting for a short period of time. The base station, which is not constrained by power limitations, can broadcast the control channel or beacon continuously. The terminal can reduce its standby power considerably without sacrificing response time. Similar techniques are used on cellular asynchronous data channels, such as General Packet Radio Service (GPRS), which uses a control channel to schedule packet deliveries. A method of power conservation in a battery-operated, portable device is also described in European Patent Publication No. EP 0 944 273 A1.

Ad-hoc radio communications schemes like Bluetooth lack a control channel concept. Reducing power consumption while the device is in idle mode (i.e., not connected) has been described in commonly assigned U.S. Pat. No. 5,940,431 entitled "Access Technique of Channel Hopping Communications System," to J. C. Haartsen and P. W. Dent, the disclosure of which is incorporated here by reference. However, reducing power consumption while terminals are connected but during pauses between asynchronous data bursts presents technical problems that are not trivial, particularly when both units have to minimize power consumption.

Accordingly, there is a need in the art for a system and method to reduce power consumption in radio units engaged in asynchronous data services. More particularly, there is a need for a system and method that allows the radio units to enter a sleep mode without requiring extra overhead.

SUMMARY

In peer-to-peer radio communications supporting asynchronous services, it is desired to reduce the power consumption in mobile terminals during pauses between data bursts. When there is no traffic on the channel for a predetermined amount of time, the units enter a low duty cycle sleep mode in which they sleep most of the time and wake up periodically, with a period T, to scan the channel for a brief time. A unit can restart communications only at specific points in time which relate to the sleep period T. The scan cycle of one unit preferably corresponds to the restart cycle of the other unit. If, for several sleep cycles, traffic does not return, T can be increased. This process may be carried out in both units, but without the units communicating to each other when the adaptation occurs. Since the two units may not update T exactly at the same time, T cannot be varied in an arbitrary fashion and cannot be based on relative timing. Instead, the scan time is based on absolute timing. Switching from one sleep/scan period to another sleep/scan period is allowed only at predetermined points in time. To prevent collisions when both units want to restart communications, the scan/restart cycles should be staggered. Once communication has restarted, the sleep mode is left. Only a predetermined period of silence on the channel can force the unit(s) into the sleep mode, starting with the smallest T.

In accordance with the present invention, there is a system for conserving power in a portable radio device. The system includes a first unit having at least a transmitter, a second unit having at least a receiver, and a communication channel through which the first unit and the second unit can communicate. Each receiver is activated for a period of time to enable the unit to receive a signal followed by a period of time in which the receiver is deactivated and the unit is unable to receive the signal. A first timing means is associated with the first unit and a second timing means associated with a second unit. Each timing means is used to measure an amount of elapsed time since the signal was last received. The system includes a plurality of time thresholds wherein the period of time for which the receiver is deactivated is increased by a time interval associated with one of the plurality of time thresholds when the amount of elapsed time exceeds the time threshold.

In accordance with another aspect of the present invention, the first unit transmits a signal to the second unit to initiate communications. The signal is transmitted more than one time. A time interval between successive attempts by the transmitter to initiate communications is determined by the amount of elapsed time since the last communication with the second unit. The time interval is associated with a time threshold exceeded by the amount of elapsed time since the last communication.

In accordance with another aspect of the present invention, there is a system for conserving power in a portable radio network. The system includes a plurality of communication devices wherein at least one of the communication devices has a transmitter and at least one of the communication devices has a receiver. There is a communication channel through which the plurality of communication devices can communicate. Each receiver is activated for a period of time to enable the communication device to receive a signal followed by a period of time in which the receiver is deactivated and the communication device is unable to receive a signal. A first timing means is associated with one of the plurality of communication devices and a second timing means is associated with another of the plurality of communication devices. Each timing means is used to measure an amount of elapsed time since the signal was last received. The system includes a plurality of time thresholds wherein the period of time for which the receiver is deactivated is increased by a time interval associated with one of the plurality of time thresholds when the amount of elapsed time exceeds the time threshold.

In accordance with another aspect of the present invention, there is a method for conserving power in a portable radio device. The method comprises the steps of measuring a period of elapsed time beginning with the end of a transmission; comparing the period of elapsed time with a threshold; increasing a time period between successive activations of a radio transmitter if the elapsed time exceeds a threshold period; and increasing a time period between successive activations of a radio receiver if the elapsed time exceeds a threshold period.

In accordance with another aspect of the present invention, there is a communication system including a first communication device having at least a transmitter, a second communication device having at least a receiver, and a communication channel through which the first communication device and the second communication device can communicate. Each receiver is activated for a period of time to enable the communication device to receive a signal followed by a period of time in which the receiver is deactivated and the communication device is unable to receive a signal. A first timing means is associated with the first communication device and a second timing means associated with a second communication device. Each timing means is used to measure an amount of elapsed time since the signal was last received. A plurality of time thresholds wherein the period of time for which the receiver is deactivated is increased by a time interval associated with one of the plurality of time thresholds when the amount of elapsed time exceeds the time threshold.

In accordance with another aspect of the present invention, there is a communication device which includes a receiver capable of interfacing with a communication channel through which the communication device can receive a signal. The receiver is activated for a period of time to enable the communication device to receive a signal followed by a period of time in which the receiver is deactivated and the communication device is unable to receive a signal. A timing means is associated with the communication device wherein the timing means is used to measure an amount of elapsed time since the signal was last received. The timing means compares the amount of elapsed time with a plurality of time thresholds wherein the period of time for which the receiver is deactivated is increased by a time interval associated with one of the plurality of time thresholds when the amount of elapsed time exceeds the time threshold.

In accordance with another aspect of the present invention, there is a method of operating a communication system having a transmitting device, a receiving device, a first timing means associated with the transmitting device, second timing means associated with the receiving device, and a communication channel through which the transmitting device transmits a signal to the receiving device. The method comprising the steps of activating the receiving device at periodic intervals; increasing the period between successive activations of the receiving device based on an elapsed time since the last communication with the transmitting device; activating the transmitting device at periodic intervals to establish communication with the receiving device; and adjusting the period between successive activations of the transmitting device to coincide with the periods of activation of the receiving device.

BRIEF DESCRIPTION OF THE DRAWINGS

FIG. 8 is a schematic depiction of a timing diagram that illustrates non-aligned switching between several scan/restart timing schemes according to the present invention.

DETAILED DESCRIPTION

In the following description, the invention is described in terms of a Bluetooth communication system, but it will be understood that Applicant's invention is not so limited. The invention is broadly applicable to peer-to-peer communication networks and can be embodied in other types of communication systems that have appropriate features.

Figure 1:
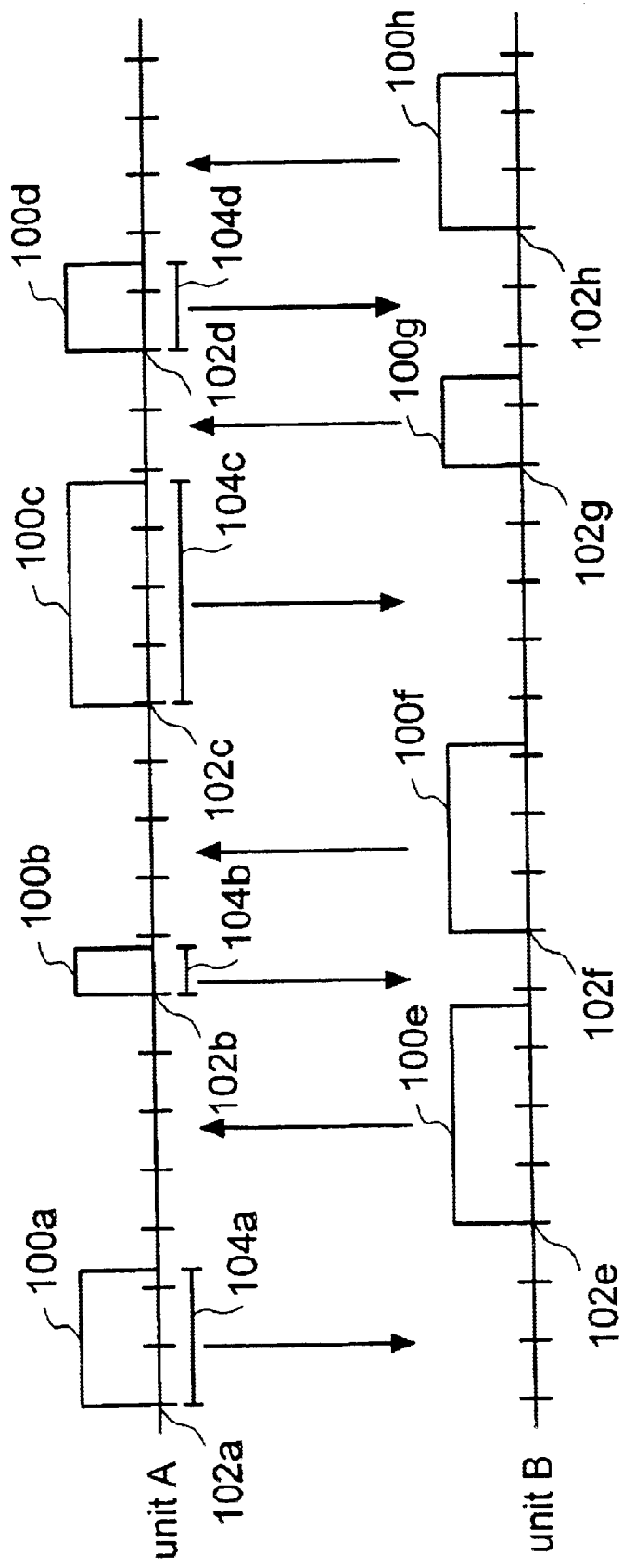
FIG. 1 is a schematic depiction of a timing diagram of a slotted time-division-duplex communication channel with asynchronous traffic flow.

FIG. 1 depicts a timing diagram of an ideal slotted, packet-based radio interface between two peer units, A and B. Packets 100 start at a slot boundary 102 and can last for a generally unrestricted period of time 104. As shown in FIG. 1, unit A transmits packet 100*a* beginning at slot boundary 102*a* and lasting for a duration 104*a*. Likewise, packet 100*b* begins at slot boundary 102*b* and lasts for a duration 104*b*. In this example, packet 100*b* has a shorter duration than packet 100*a*. As can be appreciated, unit B transmits its packets 100*e*, 100*f*, 100*g*, and 100*h* beginning at respective slot boundary 102*e*, 102*f*, 102*g*, and 102*h*. By design, unit A and unit B do not transmit at the same time.

Bluetooth implements a variation of this type of channel, in which the packet length can vary and the packet can occupy between one and five slots. Preferably, a priority scheme exists among the units so that each unit knows when it is permitted to transmit on the channel. Such a scheme is described in commonly-assigned U.S. Provisional Patent Application No. 60/226,965, entitled "Method and Apparatus for Medium Access on a Radio Channel," filed Aug. 8, 2000, incorporated herein by reference. In this priority scheme, timeslots are defined at regular intervals and the units are allowed to start transmission unconditionally. Each unit will have a different priority timeslot assigned, thereby preventing collisions due to simultaneous transmissions. Since there is no distinct uplink and downlink in peer communications, time division duplexing (TDD) is preferably used. In a TDD-enabled system, only one unit transmits while all other units listen. When the first unit has finished transmitting (either because it has transmitted its full message or it has transmitted for the maximum allowed time), the first unit releases the communication channel and other units are allowed to transmit. Using TDD obviates the need for expensive duplexers in radio transceiver equipment. TDD also simplifies the integration of a transmitter and a receiver on a single chip, since both sections of the chip never operate simultaneously. Accordingly, using TDD results in cost-effective equipment.

Figure 2:
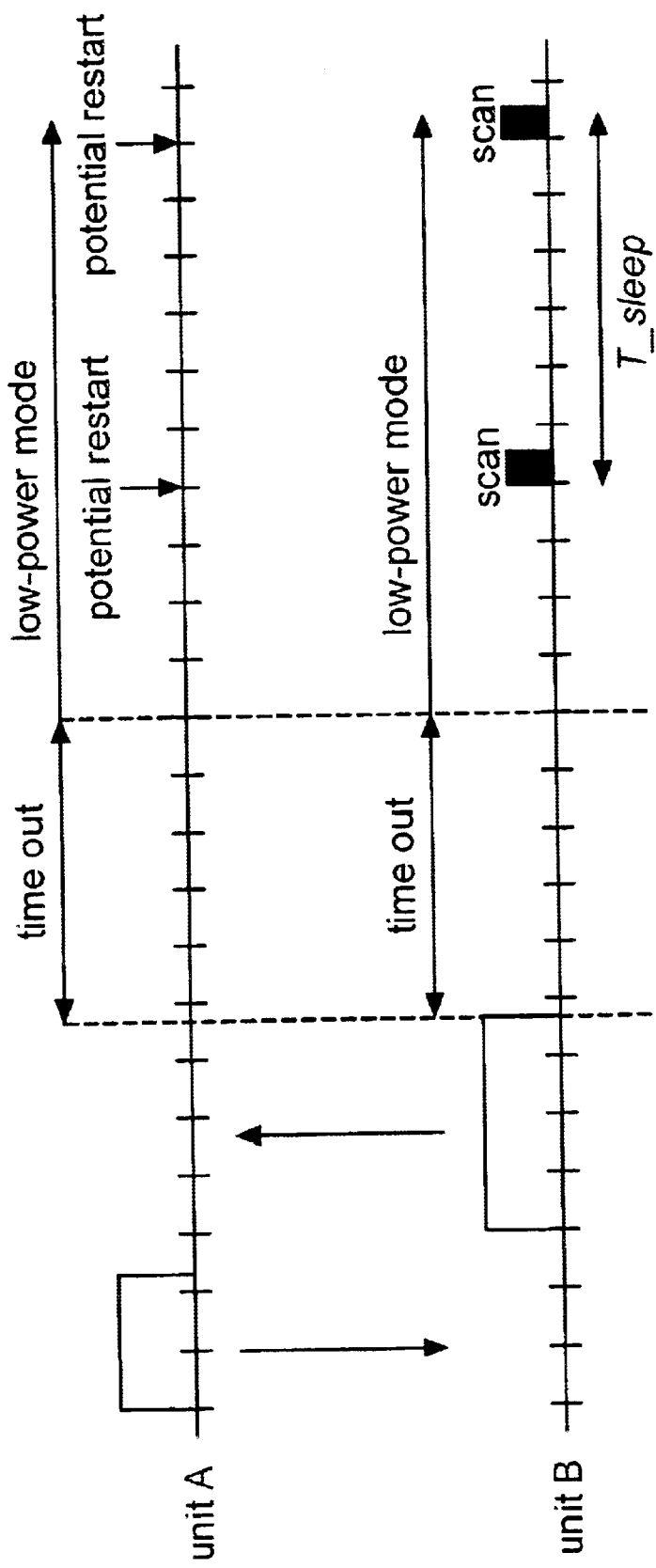
FIG. 2 is a schematic depiction of a timing diagram that illustrates entering a low-power mode according to the present invention.

As shown in FIG. 2, if the channel is idle for a period of time, the radio transceivers enter a low-power "sleep" mode and occasionally wake up to listen to the channel to see if communications have resumed. To determine when to enter a sleep mode, each unit begins measuring a time-out period once the unit is idle (i.e., not transmitting or receiving). If the unit resumes transmitting or receiving during the time-out period, then the time-out period restarts once communication ceases. When the time-out period has elapsed, the unit enters a low-power mode.

A unit wishing to resume communications may need to determine the timing of the sleep interval of a unit in low power mode, so that the unit can determine when the low-power unit is scanning and can be activated. In addition, the unit will need to determine when the unit is permitted to transmit. Accordingly, the scan cycle (indicating the periods when a unit is scanning) of one unit should be aligned with the restart cycle (indicating the periods when a unit may transmit to restart communication with another unit) of the other unit. The time position $t=t_s$ during which the scan starts in one unit, and the time position $t=t_r$ during which the restart operation starts in the other unit, should be aligned, and preferably is based on an absolute time t given by:

$$t \text{ modulo } T\_sleep = \text{offset} \quad (1)$$

where T_sleep is the interval between two consecutive scan periods.

Ideally, the period of the scan cycle is the same as the period of the restart cycle. The offset value is a time offset which is preferably smaller than T_sleep. Each unit preferably has a different offset value to prevent two units from trying to restart at the same time. The offset is preferably referenced to an absolute time. The absolute time is known by both units, provided they are synchronized. Bluetooth, for example, requires time synchronization between the participating units to implement a frequency hopping scheme.

FIG. 2 illustrates how two units A and B enter low-power mode after a time out period during which no communication has taken place. Because the scan/restart cycle is based on absolute time, the units need not enter the low-power "sleep" mode at the same time. In FIG. 2 it is assumed that only unit A can restart communications. In real peer-to-peer communications, each unit can restart communications and both should be scanning and have potential restart positions.

Figure 3:
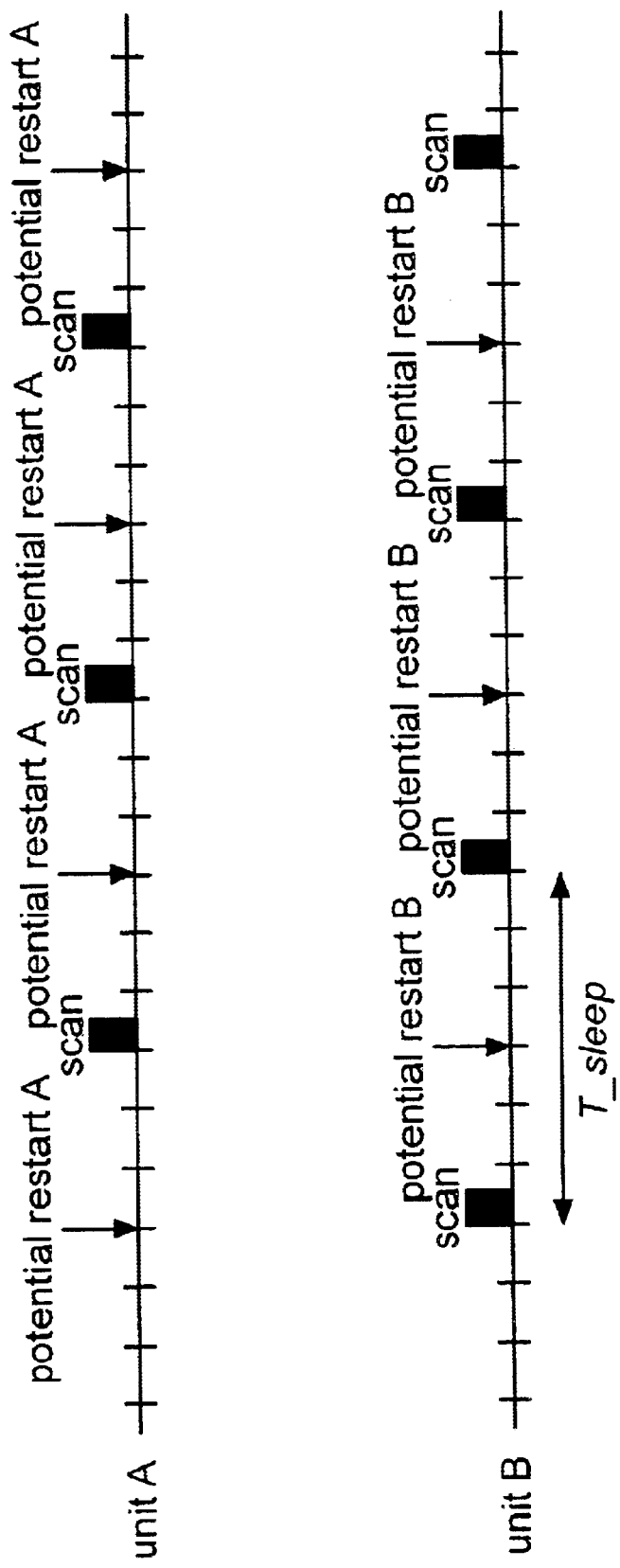
FIG. 3 is a schematic depiction of a timing diagram that illustrates a staggered start-restart timing scheme for two units according to the present invention.
Figure 4:
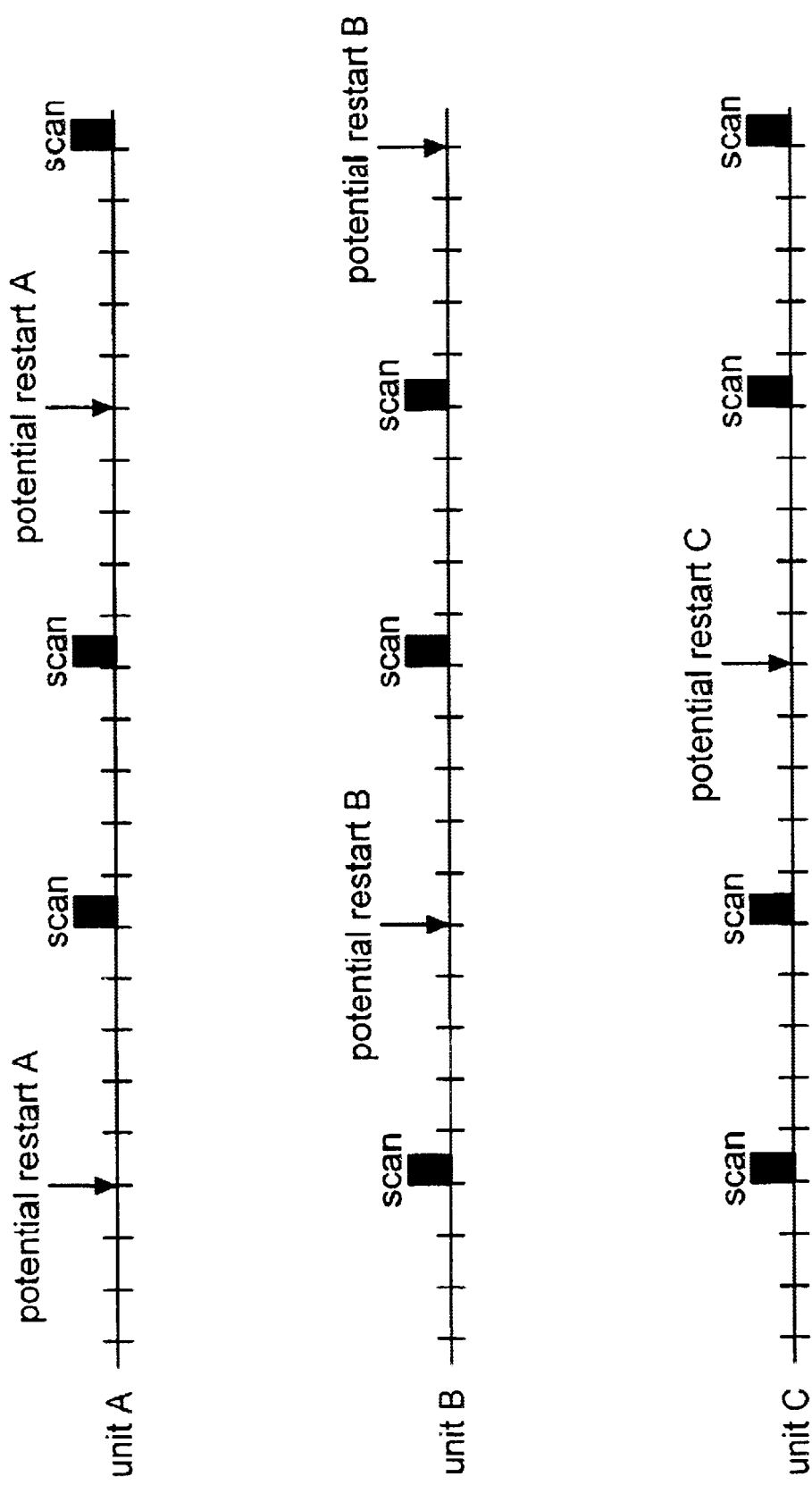
FIG. 4 is a schematic depiction of a timing diagram that illustrates staggered scan/restart timing schemes for multiple devices according to the current invention.

To prevent both units from simultaneously attempting to resume communications, the scan cycle of one unit should be staggered in time with respect to the scan cycle of another unit, as shown in FIG. 3. This is accomplished by choosing the offset value in equation 1 properly. For example, the group of offset values may be an orthogonal set, thereby ensuring that no two units will transmit at the same time. If several units on the channel enter sleep mode, each unit should have a different offset value. The staggering offset could be negotiated at connection setup and may depend on a variety of factors, such as the unit's address. If more than two units are involved, the potential restart positions corresponding to the priority slots should be staggered to prevent simultaneous transmissions and data collisions. On a potential restart position of unit i, all units j (where j≠i) scan to check whether unit i wants to resume communication. The restart and scan cycles would relate to each other as illustrated in FIG. 4 for three users. As can be appreciated, if the offset values are sufficiently small, a single scan duration could encompass the potential restart opportunities of all of the units, allowing the unit to sleep for a longer duration of time.

The sleep mode schemes illustrated in FIG. 1 through FIG. 3 have a fixed sleep interval T_sleep. The choice of T_sleep depends on a trade-off between power consumption and latency. Increasing T_sleep results in a lower duty cycle and therefore a lower power consumption. But during T_sleep, the unit cannot be activated and the response time or latency (defined as the interval between the time when one unit wants to activate a unit in sleep mode and the time the sleeping unit responds) increases. A fixed value can be chosen for T_sleep if the latency requirements are fixed. Latency may depend on a variety of factors, such as the application, traffic conditions, and may even vary in time.

For example, an application with a mouse or a pointer requires a very small latency when the user is handling (i.e., moving) the mouse. While at work, short movements are alternated by periods of idleness. The response time during these periods of idleness should be short since the user should not experience any delay while at work (although "at work" does not mean he continuously moves the mouse). However, if the user leaves his work place for a while and then returns, the response time may have grown much longer during the time of absence. The user will accept a long delay the first time he moves the mouse again, as long as the delay is reduced while he is working. In general, a response time which increases when the idle time increases is acceptable, provided the maximum delay is limited and the response time reduces to a short period as soon as work is resumed.

In bursty communication systems, the same kind of procedures can be followed. Dynamically changing T_sleep facilitates balancing power consumption and latency at any moment in time. One crucial aspect is that the scan cycles and restart cycles remain aligned. As T_sleep varies, both units should change their timing, preferably at approximately the same time. In addition, the timing change must be accomplished without the units exchanging information.

In the following description, only two units are considered. However, the procedure can easily be extended to more than two units. The procedures is based on a sleep/scan cycle which includes several substates with fixed relative time relationships. The first substate ST1 has the highest duty cycle and the shortest sleep interval. The time interval between two consecutive scan periods in this first substate is $T_1$. The second substate ST2 has a time interval between consecutive scan periods which is $T_2 = N_2 \times T_1$ where $N_2$ is an integer and $T_1$ the interval of substate ST1. The third substate ST3 has an inter-scan interval $T_3 = N_3 \times T_2 = N_3 \times N_2 \times T_1$. In general, substate STk has an inter-scan interval of $T_k = N_k \times T_{k-1}$.

Figure 5:
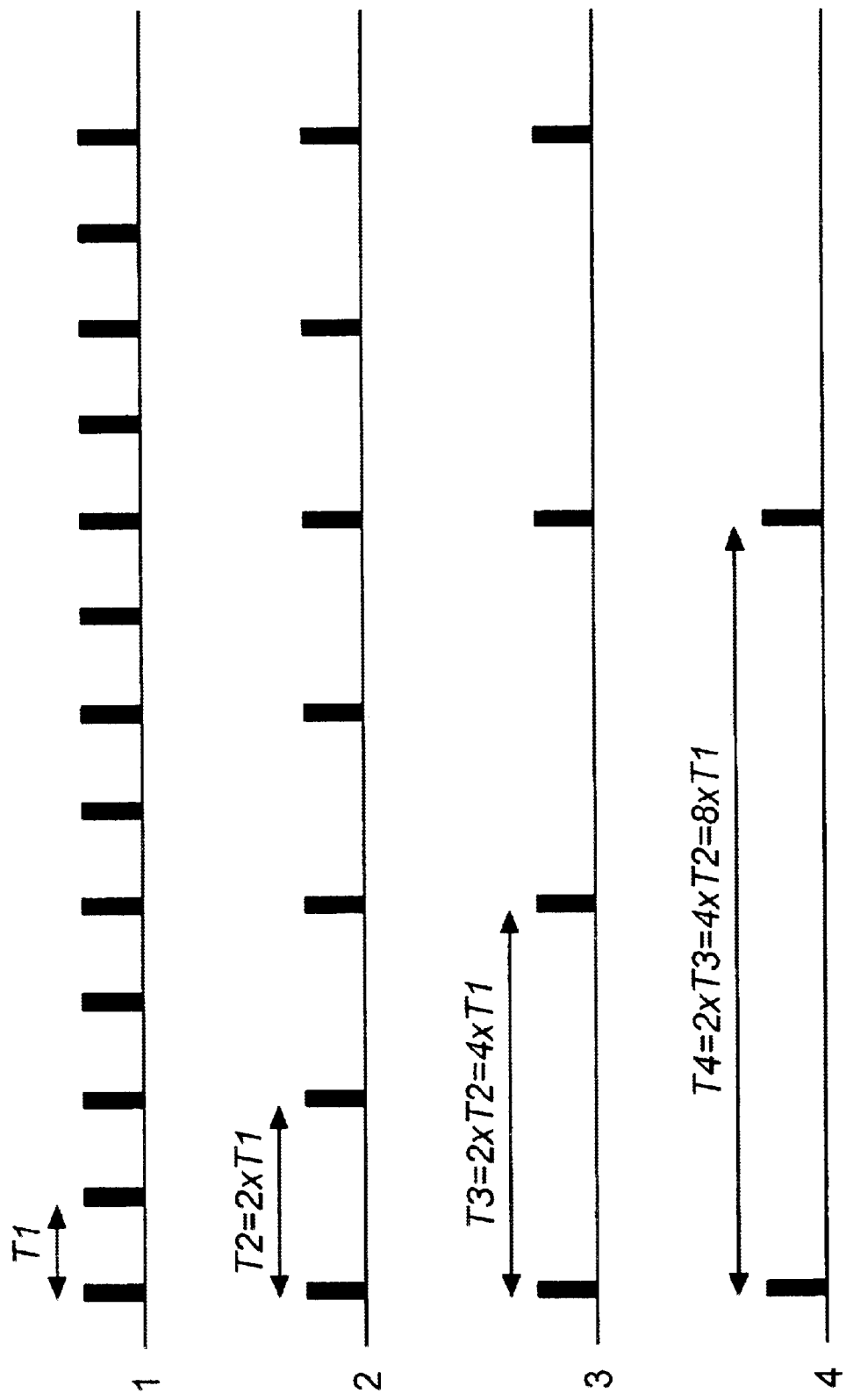
FIG. 5 is a schematic depiction of a timing diagram that illustrates several scan/restart timing schemes according to the present invention.

FIG. 5 illustrates an example of a timing scheme with four substates corresponding to the case where $N_4 = N_3 = N_2 = 2$. In this case, the duty cycle is reduced exponentially when going to a higher substate. The substates are all aligned, which means that all scan periods of substate STk occur at the same time as some of the scan periods of substate STk−1. Since STk−1 is aligned with STk−2 and so on, all higher substates are aligned with all lower substates. The substate timing is based on an absolute timing. The scan period of STk will start at time t $$t \bmod T_k = \text{offset} \qquad (2)$$

where $T_k$ is the period in scheme STk and offset is a fixed time offset smaller than $T_k$.

FIG. 5 shows the scan/sleep cycle. In correspondence with this scheme, there is a restart cycle which is used by a unit that wants to resume communications with the unit in the sleep mode. This restart scheme has exactly the same substates. However, instead of scan periods, the restart scheme indicates the potential restart points where a unit can start transmitting data and resume communications.

Figure 6:
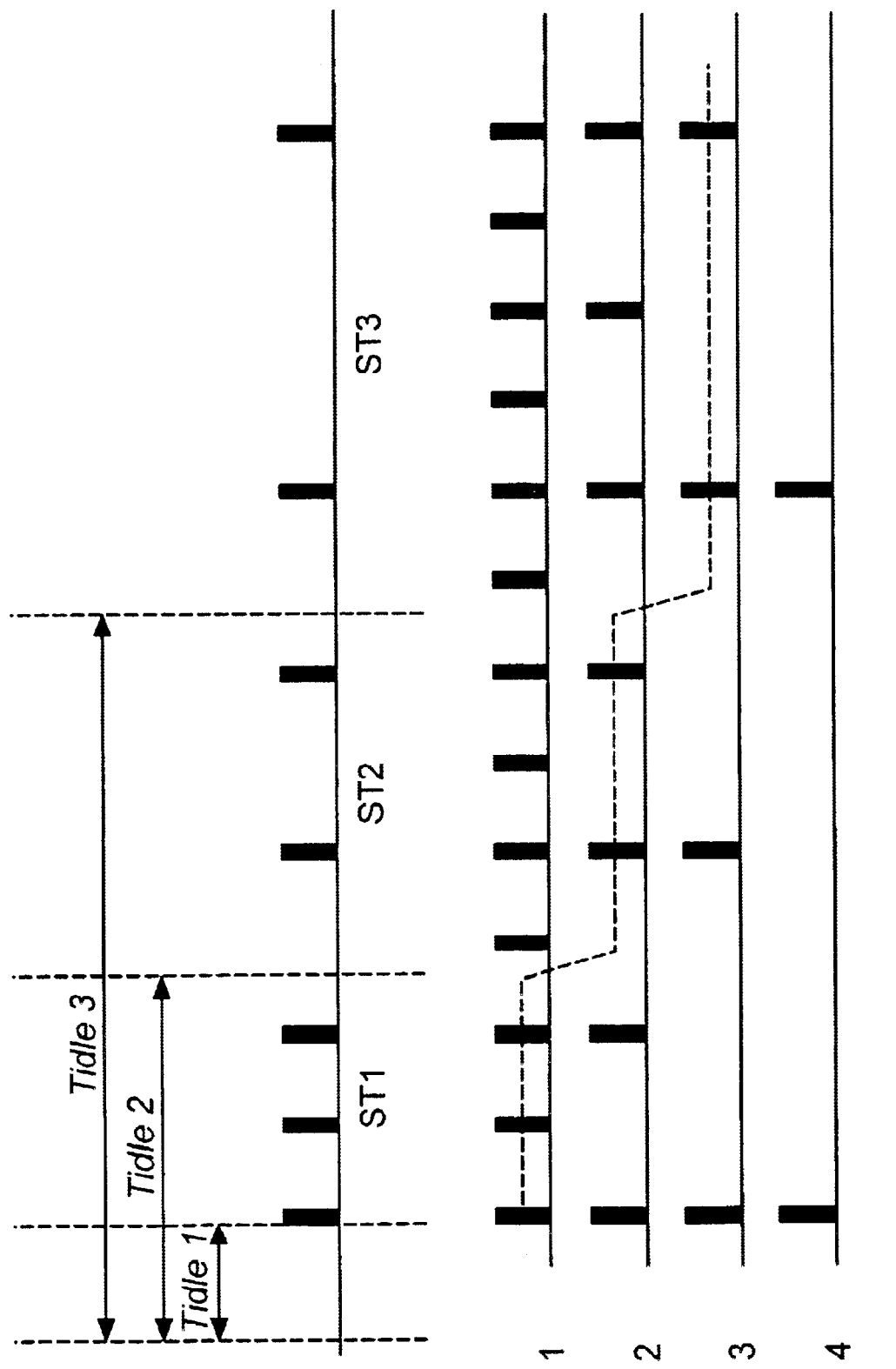
FIG. 6 is a schematic depiction of a timing diagram that illustrates switching between several scan/restart timing schemes according to the present invention.

FIG. 6 illustrates a timing scheme in which A and B, have established a communication channel. Assume that unit B is a power sensitive device that needs to save as much power as possible. If the channel has been silent for time Tidle₁1, then unit B will enter the ST1 low-power state. Unit B will sleep for most of the time, but every $T_1$ seconds will wake up and scan to determine if unit A has something to send. If the channel is still silent, then unit B will enter the ST2 low power state if the silent period has exceeded Tidle_2 seconds (using the same reference as for determining Tidle_1, e.g., the end of the last information packet exchanged on the channel). As shown in FIG. 6, this can continue with Tidle_3, ST3, etc.

Note that for a switch from STk−1 to STk, Tidle_k is used which is preferably based on the same absolute reference that defined the end of the active state. If each new time out had been based on the previous time out period, then an accumulation of inaccuracies would arise, deteriorating the alignment between the sleep and restart cycles as discussed below.

If there is information on the channel during a scan period, then unit B leaves the low power mode and enters the active state. If the channel becomes idle again, then the sleep-mode timing scheme begins all over again starting with low-power mode ST1.

Figure 7:
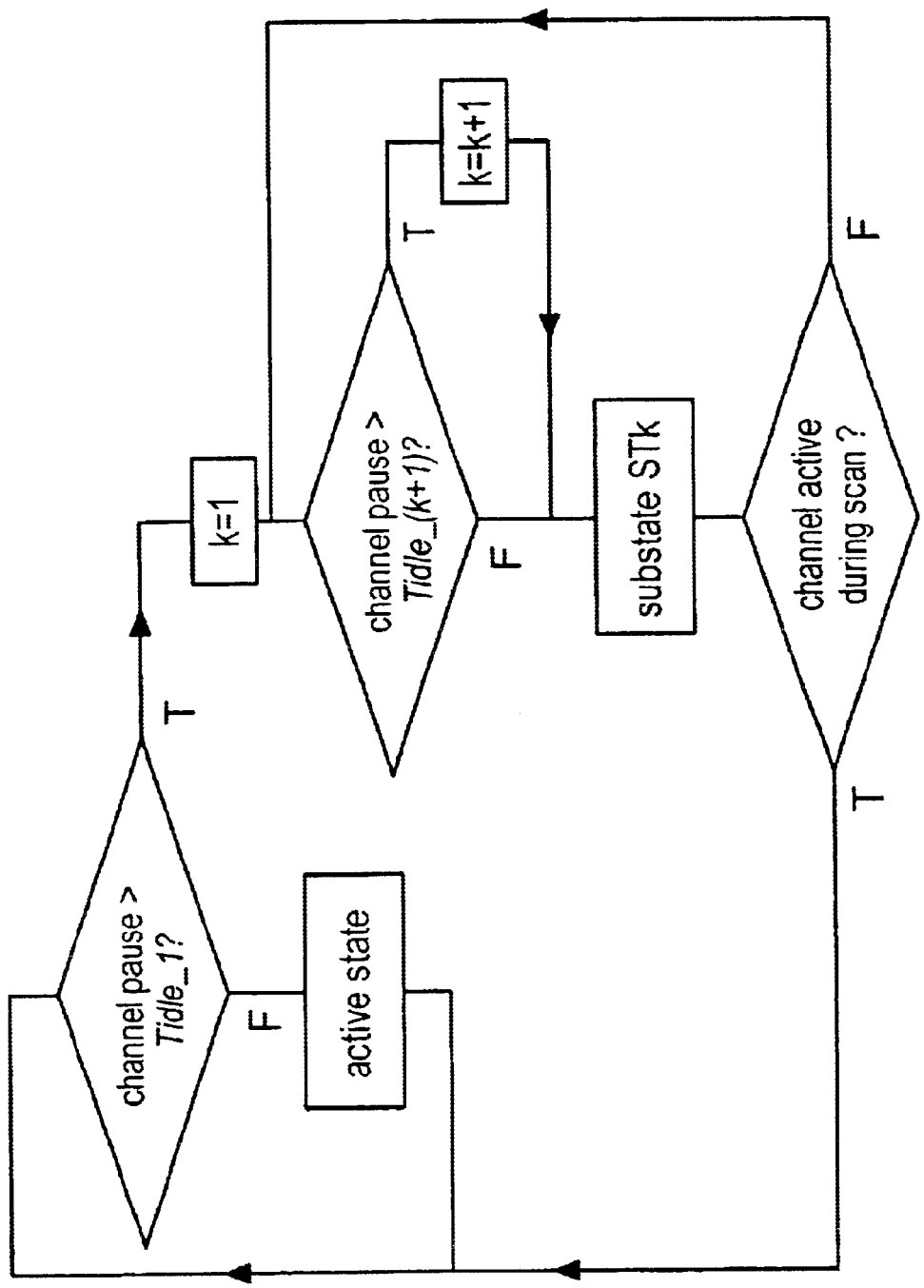
FIG. 7 is a flow diagram illustrating operation of sleep modes.

The activity of unit B is generally described in the flow diagram shown in FIG. 7. The unit begins in the active state. Once the communication channel remains idle for more than Tidle_1, the unit advances to the first substate and begins periodic scans according to the timing diagram in FIG. 6. If the channel remains idle for Tidle_2, then the unit advances to the second substate. This progression through the substates continues as the idle time reaches the threshold for each substate. If the channel becomes active during a scan period, the unit returns to the active state. Accordingly, a subsequent idle period of sufficient duration (i.e., Tidle_1) will cause the unit to again enter the first substate.

Since the low-power scheme is based on absolute timing, unit A can determine when unit B's scan periods occur (provided unit A knows unit B's offset). However, unit A may not know exactly which substate unit B is operating in. This is because unit A cannot know precisely when unit B determined that the channel was idle and determined when to switch substates. That is, unit A does not track when unit B last transmitted or received a message. Due to communication errors, unit A may assume a reference which is different from the reference used by unit B. However, unit A will know the trend (ST1 to ST2 to ST3 etc.) and the exact scan positions of STk. Accordingly, unit A can activate unit B, although it may take a little longer than if unit A had knowledge of the substate in which unit B is operating.

FIG. 8a and FIG. 8b illustrate the situation when unit A assumes that unit B is operating in a substate different from the substate unit B is actually operating in. In FIG. 8a, unit A may wait unnecessarily for unit B to wake up during the time that unit B is in ST1 but unit A assumes that unit B is operating in ST2. In FIG. 8b, unit A may transmit unnecessarily since unit B is not scanning as frequently when it is in ST2, but unit A assumes unit B is operating in ST1. Note that this situation only arises for a time period where units A and B use different substates. This time period corresponds to the time offset between the references times used in units A and B, respectively. In another embodiment, unit A may always use STk−1 when it predicts that unit B is in STk. In this way, the shortest response time for the mode unit A resides in is guaranteed, but at the expense of possible extra transmissions.

The previous scheme is a one-directional procedure between one recipient (unit B in the above example) and an activator (unit A). The procedure can equally well be established in the opposite direction (unit B activator and unit A recipient). The sleep periods N×T1 do not have to be the same in both directions. If they are, preferably, the offset value is chosen differently for each direction so that the schemes are staggered. This means that the restart timing points do not overlap and there is no possibility of a collision when both units want to activate each other. If more than two units are involved, each should chooses a different offset value, similar as was shown in FIG. 5.

The invention has been described in accordance with a single preferred embodiment. In light of this disclosure, those skilled in the art will likely make alternate embodiments of this invention. These and other alternate embodiments are intended to fall within the scope of the claims which follow.

It should be emphasized that the term "comprises/comprising" when used in this specification is taken to specify the presence of stated features, integers, steps, or components but does not preclude the presence or addition of one or more other features, integers, steps, components, or groups thereof

What is claimed is:

1. A system for conserving power in a portable radio network comprising:
   a plurality of communication devices, wherein at least one of the communication devices has a transmitter configured to transmit a signal at periodic intervals to initiate communications and at least one of the communication devices has a receiver configured to be deactivated for a period of time during which the device is unable to receive communications then activated for a period of time to enable the device to receive the signal to initiate communications;
   a communication channel through which the plurality of communication devices can communicate, the communication channel establishing a common time reference to which the communication devices are synchronized;
   a first timing means associated with one of the plurality of communication devices and a second timing means associated with another of the plurality of communication devices, each timing means employing the common time reference to measure an amount of elapsed time since the respective communication device last transmitted or received a communication; and
   a plurality of time thresholds, wherein the period of time for which the receiver is deactivated and the periodic intervals of the signal to initiate communications can be increased at a same or different time by a time interval associated with a same or different one of the plurality of time thresholds when the amount of elapsed time exceeds the time threshold;
   wherein the active period for the receiver is offset in time from the common reference and the plurality of time thresholds are related such that the periods of time for which the receiver is deactivated and the periodic intervals of the signal to initiate communications differ by predetermined factors for respective consecutive time thresholds.

2. The system of claim 1, wherein the communication channel is a radio frequency band employing frequency-hopping and time-division-duplexing.

3. The system of claim 1, wherein the predetermined factors are two.

4. A communication system comprising:
   a first communication device having at least a transmitter configured to transmit a signal at periodic intervals to initiate communications;
   a second communication device having at least a receiver configured to be deactivated for a period of time during which the device is unable to receive communications then activated for a period of time to enable the device to receive the signal to initiate communications;
   a communication channel through which the first communication device and the second communication device can communicate, the communication channel establishing a common time reference to which the communication devices are synchronized;
   a first timing means associated with the first communication device and a second timing means associated with a second communication device, each timing means employing the common time reference to measure an amount of elapsed time since the respective communication device last transmitted or received a communication; and
   a plurality of time thresholds, wherein the period of time for which the receiver is deactivated and the periodic intervals of the signal to initiate communications can be increased at a same or different time by a time interval associated with a same or different one of the plurality of time thresholds when the amount of elapsed time exceeds the time threshold, and the plurality of time thresholds are related such that the periods of time for which the receiver is deactivated and the periodic intervals of the signal to initiate communications differ by predetermined factors for respective consecutive time thresholds.

5. The system of claim 4, wherein the first communication device and the second communication device are battery powered and the predetermined factors are two.

6. The system of claim 4, wherein the communication channel is a radio frequency band employing frequency-hopping and time-division-duplexing.

7. The system of claim 4, wherein the first and second timing means are integral to the first and second communication devices.

8. A system for conserving power in a portable radio device comprising:
   a first unit having at least a transmitter configured to transmit a signal at periodic intervals to initiate communications;
   a second unit having at least a receiver configured to be deactivated for a period of time during which the second unit is unable to receive communications then activated for a period of time to enable the second unit to receive the signal to initiate communications;

a communication channel through which the first unit and the second unit can communicate, the communication channel establishing a common time reference to which the first and second units are synchronized;

a first timing means associated with the first unit and a second timing means associated with the second unit, each timing means employing the common time reference to measure an amount of elapsed time since the respective unit last transmitted or received a communication; and a plurality of time thresholds, wherein the period of time for which the receiver is deactivated and the periodic intervals of the signal to initiate communications can be increased at a same or different time by a time interval associated with a same or different one of the plurality of time thresholds when the amount of elapsed time exceeds the time threshold, and the plurality of time thresholds are related such that the periods of time for which the receiver is deactivated and the periodic intervals of the signal to initiate communications differ by predetermined factors for respective consecutive time thresholds.

9. The system of claim 8, wherein the communication channel is a radio frequency band employing frequency-hopping and time-division-duplexing.

10. The system of claim 8, wherein the first unit further comprises a receiver and the second unit further comprises a transmitter.

11. The system of claim 8, wherein the first and second timing means are integral to the first and second units.

12. The system of claim 8, wherein the predetermined factors are two.

13. A method of operating a communication system having a transmitting device, a receiving device, a first timing means associated with the transmitting device, a second timing means associated with the receiving device, and a communication channel through which the transmitting device transmits a signal to the receiving device, the method comprising the steps of:

activating the receiving device at periodic intervals;

increasing the period between successive activations of the receiving device based on an elapsed time since the last communication with the transmitting device;

activating the transmitting device at periodic intervals to establish communication with the receiving device; and adjusting the period between successive activations of the transmitting device to coincide with the periods of activation of the receiving device;

wherein the activations of the receiving and transmitting devices are offset in time from an absolute time reference, periods between successive activations of the receiving device are increased by a first predetermined factor, periods between successive activations of the transmitting device are increased by a second predetermined factor, and the increasing and adjusting of the periods between the successive activations of the receiving and transmitting devices can occur at a same or different time.

14. A communication device comprising:

a receiver capable of interfacing with a communication channel through which the communication device can receive a signal, wherein the receiver is configured to be deactivated for a period of time during which the device is unable to receive the signal then activated for a period of time to enable the device to receive the signal to initiate communications;

a timing means associated with the communication device wherein the timing means is used to measure an amount of elapsed time since the signal was last received and is based on an absolute time reference; and a plurality of time thresholds, wherein the period of time for which the receiver is deactivated and periodic intervals of the signal to initiate communications can be increased at a same or different time by a time interval associated with a same or different one of the plurality of time thresholds when the amount of elapsed time exceeds the time threshold, and the plurality of time thresholds are related such that the periods of time for which the receiver is deactivated and the periodic intervals of the signal to initiate communications differ by predetermined factors for respective consecutive time thresholds.

15. The device of claim 14, wherein the communication channel is a radio frequency band employing frequency-hopping and time-division-duplexing.

16. The system of claim 14, wherein the communication device is battery powered and the predetermined factors are two.

17. The system of claim 14, wherein the timing means is integral to the communication device.

18. A method for conserving power in a portable radio device comprising the steps of:

measuring a period of elapsed time beginning with the end of a transmission;

comparing the period of elapsed time with a threshold;

increasing a time period between successive activations of a radio receiver if the elapsed time exceeds a threshold period; and increasing a time period between successive activations of a radio transmitter to initiate communications with the radio receiver if the elapsed time exceeds a threshold period;

wherein the activations of the radio receiver and transmitter are offset in time from an absolute time reference, and time periods between successive activations of the radio receiver and transmitter can be increased at a same or different time by a predetermined factor.

19. The method of claim 18, wherein the predetermined factor is two.

* * * * *

UNITED STATES PATENT AND TRADEMARK OFFICE
CERTIFICATE OF CORRECTION

PATENT NO. : 6,804,542 B1
DATED : October 12, 2004
INVENTOR(S) : Jacobus Cornelis Haartsen It is certified that error appears in the above-identified patent and that said Letters Patent is hereby corrected as shown below:

Column 8,
Line 23, change "$Tidle_11$" to -- $Tidle\_1$ --.

Signed and Sealed this

Thirteenth Day of June, 2006

JON W. DUDAS
*Director of the United States Patent and Trademark Office*